United States Patent [19]

Stretanski

[11] 4,237,042

[45] Dec. 2, 1980

[54] POLYOLEFINS STABILIZED AGAINST LIGHT-INDUCED DEGRADATION

[75] Inventor: Joseph A. Stretanski, Clinton, N.J.

[73] Assignee: American Cyanamid Company, Stamford, Conn.

[21] Appl. No.: 951,230

[22] Filed: Oct. 13, 1978

[51] Int. Cl.³ ............................................... C08K 5/52
[52] U.S. Cl. ...................... 260/45.8 R; 260/45.85 R; 252/404
[58] Field of Search .................. 260/45.85 B, 45.8 R; 252/404

[56] References Cited

U.S. PATENT DOCUMENTS

| 3,039,993 | 6/1962 | Friedman | 260/45.8 R |
| 3,205,250 | 9/1965 | Hechenkleikner | 260/45.8 R |
| 3,206,431 | 9/1965 | Doyle et al. | 260/45.7 PH |
| 4,064,100 | 12/1977 | Hechenbleikner | 260/45.8 R |

FOREIGN PATENT DOCUMENTS 1336391 11/1973 United Kingdom .

OTHER PUBLICATIONS

Plastics Engineering, Oct. 1976 pp. 51 to 57–Cowell.

*Primary Examiner*—V. P. Hoke
*Attorney, Agent, or Firm*—Bruce F. Jacobs

[57] ABSTRACT

Polyolefins are stabilized from light-induced degradation through incorporating a combination of n-hexadecyl 3,5-di-t.butyl-4-hydroxybenzoate and a dialkyl pentaerythrityl diphosphite. Further improvement is obtained by incorporating a benzotriazole or benzophenone.

11 Claims, No Drawings

POLYOLEFINS STABILIZED AGAINST LIGHT-INDUCED DEGRADATION

The present invention relates in general to the stabilization of poly-α-olefins against light-induced deterioration and, in particular, to polypropylene compositions so stabilized by the incorporation therein of an effective light stabilizing amount of a combination of (a) n-hexadecyl 3,5-di-t.butyl-4-hydroxybenzoate and (b) a dialkyl pentaerythrityl diphosphite. Optionally, a benzophenone or benzotriazole may be added for improved stability.

U.S. Pat. No. 3,206,431 discloses the use of alkyl esters of 3,5-di-t.butyl-4-hydroxybenzoic acid as light stabilizers for polyolefins. Additional antioxidants such as phosphite esters like triphenyl phosphite, dibutyl phosphite, and alkyl aryl phosphites such as dibutyl phenyl phosphite, are disclosed as being useful in conjunction with the alkyl esters.

U.S. Pat. No. 3,681,431 discloses the use of n-octadecyl 3,5-di-t.butyl-4-hydroxybenzoate as an antioxidant for polyolefins.

British Pat. No. 1,336,391 discloses the use of aryl esters of 3,5-di-t.butyl-4-hydroxybenzoic acid as light stabilizers for polyolefins in combination with a benzophenone, and in combination with peroxide decomposer such as triphenyl phosphite, diphenyl alkyl phosphites, phenyl dialkyl phosphites, tris(nonylphenyl)phosphite, trilauryl phosphite, trioctadecyl phosphite, and diisodecyl pentaerythrityl diphosphite.

U.S. Pat. No. 3,502,613 discloses the use of the aryl esters in a complex synergistic mixture with a chlorobenzotriazole, a phenolic antioxidant, and an ester of thiodipropionic acid.

Neither the alkyl esters nor the aryl esters of 3,5-di-t.butyl-4-hydroxybenzoic acid are, when used alone, completely satisfactory light stabilizers for polyolefins, although it is believed that the alkyl esters, particularly the higher alkyl ($C_8$–$C_{20}$), are somewhat superior to the aryl esters.

The present invention provides light stabilizer compositions, which exhibit enhanced light stability in poly-α-olefins, comprising a combination of (a) n-hexadecyl 3,5-di-t.butyl-4-hydroxybenzoate and (b) a dialkyl pentaerythrityl diphosphite compound, represented by the formula:

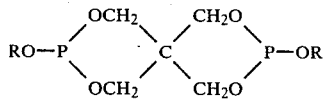

wherein R is an alkyl group containing from about 8 to 20 carbon atoms. Further enhancement of the light stability arises from adding to the above combination a benzophenone or benzotriazole compound.

The invention provides light stabilizer compositions, as defined, and light stabilized poly-α-olefin compositions containing an effective light stabilizing amount of the light stabilizer composition, as well as a method for stabilizing poly-α-olefins against light-induced degradation by the incorporation therein of an effective light stabilizing amount of the above-defined light stabilizer compositions.

The compositions of the invention provide significantly enhanced light stability to poly-α-olefins, particularly polypropylene, over either component used alone at the same concentration, or over combinations of n-hexadecyl 3,5-di-t.butyl-4-hydroxybenzoate with other known phosphate esters, or over aryl esters of 3,5-di-t.butyl-4-hydroxybenzoic acid with known phosphites, including dialkyl pentaerythrityl diphosphites.

n-Hexadecyl 3,5-di-t.butyl-4-hydroxybenzoate is a known compound. It may be prepared in accordance with procedures described in U.S. Pat. No. 3,681,431, for the preparation of the n-octadecyl ester, except that n-hexadecanol is used instead of n-octadecanol.

The dialkyl pentaerythrityl diphosphites are also known compounds and are described in U.S. Pat. No. 3,205,250, particularly column 7, lines 25–43, and in Examples 9–13 therein. The preferred dialkyl pentaerythrityl diphosphites contain $C_8$–$C_{20}$ alkyl groups, and most preferably contain $C_{12}$–$C_{20}$ alkyl groups, representative of which are diisodecyl pentaerythrityl diphosphite, distearyl pentaerythrityl diphosphite, dilauryl pentaerythrityl diphosphite, and the like. Distearyl pentaerythrityl diphosphite, available commercially as Weston 618 (Weston Chem. Co.) is the most preferred diphosphite.

In general, effective stabilization of the polyolefin is achieved by the incorporation therein of about 0.1 to 2 percent by weight of the light stabilizer combination of the invention and preferably from about 0.25 to about 1 percent by weight.

The weight ratio of the n-hexadecyl ester of 3,5-di-t.butyl-4-hydroxybenzoic acid and to the dialkyl pentaerythrityl diphosphite in the light stabilizer combination will preferably be such as to minimize the amount of the phosphite ester. In general, however, effective weight ratios will vary between about 1:1 to about 5:1 (ester:phosphite). The benzophenone or benzotriazole when used, are used in amounts of about 0.1 to 1 percent by weight.

The stabilizer composition of the invention may also contain a benzophenone or benzotriazole light stabilizer to provide further enhancement of activity. The benzophenone or benzotriazole may be added in an amount of from about 0.1 to 1 percent by weight, based on the weight of the polymer, with the ratio of n-hexadecyl ester to benzophenone or benzotriazole being about 1/1 to 5/1. Representative benzophenones include 2-hydroxy-4-octyloxybenzophenone, 2-hydroxy-4-dodecyloxybenzophenone, 2-hydroxy-4-n-hexyloxybenzophenone, 2-hydroxy-4-methoxybenzophenone, 2,2'-dihydroxy-4,4'-dimethoxybenzophenone, 2,2'-dihydroxy-4-methoxybenzophenone, and the like; representative benzotriazoles include 2-(2'-hydroxy-5'-methylphenyl)benzotriazole, 2-(3'-tert.butyl-2'-hydroxy-5'-methylphenyl)-5-chlorobenzotriazole, 2-(3',5'-di-tert.butyl-2'-hydroxyphenyl)-5-chlorobenzotriazole, 2-(2'-hydroxy-5'-tert.octylphenyl)benzotriazole, 2-(3',5'-di-tert.amyl-2'-hydroxyphenyl)benzotriazole, and the like.

The polyolefins stabilized in accordance with the invention are poly-α-olefins, particularly polypropylene, and include low and high density polyethylene, polybutylene, and copolymers of ethylene and propylene and ethylene and butylene, and the like.

The stabilizer composition may be incorporated into the polyolefin by any of the means well-known in the art for such purpose, including dry blending of the additive with the polyolefin in powder or granular form, followed by milling, Banbury mixing, molding, casting, etc. Also, in accordance with conventional practice, the compositions may include other stabilizers, such as processing antioxidants, lubricants, fillers, pigments and dyes, antistatic agents, and the like.

EXAMPLE 1

Unstabilized powdered polypropylene (Profax 6401-Hercules; 100 parts by weight) was dry blended with 0.05 part by weight of 2,6-di-t.butyl-4-methyl phenol, 0.05 part by weight of n-octadecyl 3,5-di-t.butyl-4-hydroxyhydrocinnamate, 0.1 part by weight of calcium stearate, and the light stabilizers shown in the accompanying table. The compositions were then extruded at a maximum extrusion temperature of 440° F. and pelletized. The pellets were then extruded into fibers at a maximum temperature of 485° F. using a draw ratio of 7/1. The fibers were exposed to a Xenon arc in a Weather-O-Meter and periodically tested for tensile (break) strength. The data shown in the table represent the time in hours for the fiber to lose 50% of its original tenbile (break) strength.

TABLE I

| Additive | Hours to 50% of Original Strength Xenon Weather-O-Meter |
|---|---|
| a. None | 550 |
| b. Ester (A), 0.5% | 2290 |
| c. Diphosphite (B), 0.5% | 1560 |
| d. (A), 0.25% + (B), 0.25% | 3460* |
| e. Ester (C), 0.5% | 2370 |
| f. (C), 0.25% + (B), 0.25% | 2330 |

*This invention
Ester (A) = n-hexadecyl 3,5-di-t.butyl-4-hydroxybenzoate
Ester (C) = 2,4-di-t.butylphenyl 3,5-di-t.butyl-4-hydroxybenzoate
Diphosphite (B) = distearyl pentaerythrityl diphosphite The data show the unexpected enhancement of light stabilization by the combination of the invention (d) over either component alone (b) and (c), as well as over the aryl ester alone (e) or in combination with distearyl pentaerythrityl diphosphite (f).

What is claimed is:

1. A light stable composition comprising a poly-α-olefin and from about 0.1 to 2.0 percent by weight thereof of a light stabilizer combination of (a) n-hexadecyl 3,5-di-t.butyl-4-hydroxybenzoate and (b) a dialkyl pentaerythrityl diphosphite represented by the formula:

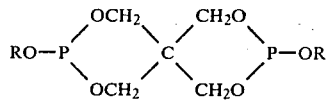

wherein R is alkyl of 8 to 20 carbon atoms.

2. The composition according to claim 1 wherein said poly-α-olefin is polypropylene.
3. The composition according to claim 1 wherein said R is alkyl of $C_{12}$ to $C_{20}$.
4. The composition according to claim 1 wherein the weight ratio of (a) to (b) is in the range 1:1 to 5:1.
5. The composition according to claim 1 further containing about 0.1 to 1% by weight of a benzophenone or benzotriazole compound.
6. A light stabilizer composition for the stabilization of polyolefins against degradation induced by light comprising a mixture of (a) n-hexadecyl 3,5-di-t.butyl-4-hydroxybenzoate and (b) a dialkyl pentaerythrityl diphosphite represented by the formula

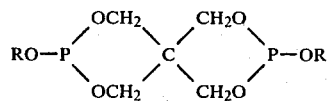

wherein R is alkyl of 8 to 20 carbon atoms.

7. The light stabilizer composition according to claim 6 wherein said R is $C_{12}$ to $C_{20}$ alkyl.
8. The light stabilizer composition according to claim 6 wherein the ratio of (a) to (b) is in the range 1:1 to 5:1.
9. The light stabilizer composition according to claim 6 further containing about 0.1 to 1% by weight of a benzophenone or benzotriazole compound.
10. The composition according to claim 1 wherein the diphosphite is distearyl pentaerythrityl diphosphite.
11. The light stabilizer composition according to claim 6 wherein the diphosphite is distearyl pentaerythrityl diphosphite.

* * * * *